US012658987B2

(12) United States Patent
Chi et al.

(10) Patent No.: US 12,658,987 B2
(45) Date of Patent: Jun. 16, 2026

(54) PRECODING MODEL TRAINING METHOD AND APPARATUS, AND PRECODING METHOD AND APPARATUS

(71) Applicant: Beijing Xiaomi Mobile Software Co., Ltd., Beijing (CN)

(72) Inventors: Liangang Chi, Beijing (CN); Dong Chen, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 317 days.

(21) Appl. No.: 18/684,791

(22) PCT Filed: Aug. 20, 2021

(86) PCT No.: PCT/CN2021/113890
§ 371 (c)(1),
(2) Date: Feb. 19, 2024

(87) PCT Pub. No.: WO2023/019585
PCT Pub. Date: Feb. 23, 2023

(65) Prior Publication Data
US 2024/0356591 A1     Oct. 24, 2024

(51) Int. Cl.
*H04B 7/0456* (2017.01)
*H04B 7/06* (2006.01)
*H04W 24/02* (2009.01)
(52) U.S. Cl.
CPC ......... *H04B 7/0456* (2013.01); *H04B 7/0626* (2013.01); *H04W 24/02* (2013.01)
(58) Field of Classification Search
CPC .... H04B 7/0456; H04B 7/0626; H04W 24/02
See application file for complete search history.

(56) References Cited

U.S. PATENT DOCUMENTS

2021/0248447 A1     8/2021   Rickard et al.
2023/0040739 A1*    2/2023   Song ..................... H04L 5/0057

FOREIGN PATENT DOCUMENTS

CN          108390706 A      8/2018
CN          108847876 A     11/2018
CN          113162666 A      7/2021

OTHER PUBLICATIONS

International Search Report mailed on May 17, 2022 in PCT/CN2021/113890 filed on Aug. 20, 2021, 4 pages (with English Translation).

* cited by examiner

*Primary Examiner* — Ronald B Abelson
(74) *Attorney, Agent, or Firm* — Oblon, McClelland, Maier & Neustadt, L.L.P.

(57) ABSTRACT

Disclosed in the embodiments of the present disclosure are a precoding model training method and apparatus, and a precoding method and apparatus. The precoding model training method comprises: a network device receiving channel state information of K terminals, wherein K is an integer greater than 0; and according to the channel state information, training a precoding model, i.e. a DNet model, wherein the DNet model comprises a compression reconstruction sub-model, i.e. a DiSNet model, and a precoding sub-model, i.e. a PreNet model, the DiSNet model comprising K groups of paired compression sub-models and reconstruction sub-models. By means of implementing the embodiments of the present disclosure, a precoding model, i.e. a DNet model, can perform distributed processing on channel state information of a plurality of terminals, such that a network device can perform high-efficiency precoding design when the terminals have limited feedback.

16 Claims, 5 Drawing Sheets

According to the precoding model training method in the above embodiment, obtain a precoding DNet model; where the DNet model includes a channel compression reconstruction submodel DiSNet model and a precoding design submodel PreNet model; the DiSNet model includes K groups of paired compression submodels-reconstruction submodels, K compression submodels are sent to K terminals in a distributed transmission manner; where K is an integer greater than 0 — S10

Receive compressed channel state information sent by k terminals among the K terminals; where k is an integer greater than 0 and less than or equal to K — S20

Input the compressed channel state information into the DNet model to generate a corresponding hybrid precoding matrix — S30

FIG. 8

Receive a compression submodel configured by a network device — S100

Input channel state information into the compression submodel to generate compressed channel state information and send the compressed channel state information to the network device — S200

FIG. 9

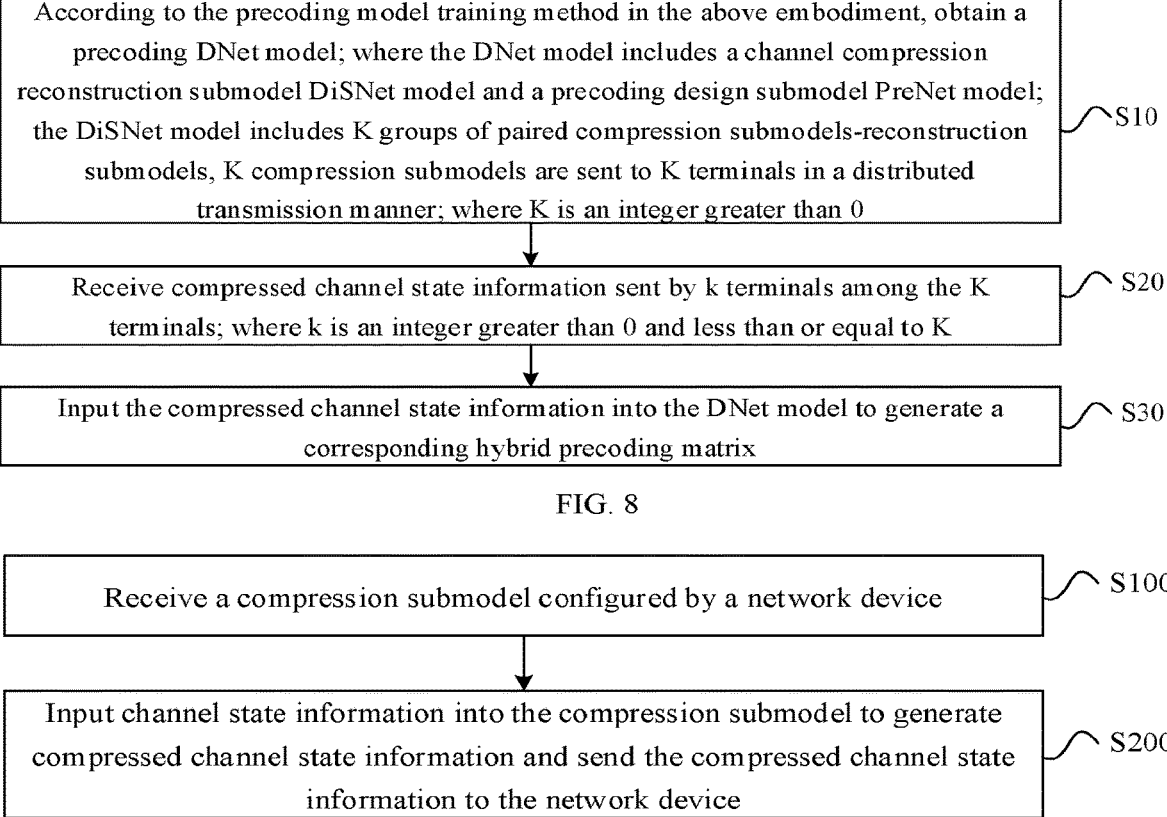

100

Precoding model training apparatus

101 Information obtaining unit

102 Model training unit

Precoding apparatus

701 Transceiver module

702 Processing module

FIG. 11

PRECODING MODEL TRAINING METHOD AND APPARATUS, AND PRECODING METHOD AND APPARATUS

CROSS-REFERENCE TO RELATED APPLICATION

The application is a U.S. National Stage of International Application No. PCT/CN2021/113890 filed on Aug. 20, 2021, the entire content of which is incorporated herein by reference for all purposes.

BACKGROUND

Technical Field

The present disclosure relates to the field of communication technologies, and in particular, to a precoding model training method, a precoding method and apparatus.

Description of the Related Art

The massive-multiple-input multiple-output (m-MIMO) technology is regarded as a key technology in future wireless communication, and is also a basic component in the 5G wireless communication network.

In order to take full advantage of this technique, a proper precoding design is required. In the frequency division duplexing (FDD) system, the terminal estimates the downlink channel, and then feeds back the channel state information to the network device. However, the number of m-MIMO antennas is large, and the dimension of the m-MIMO channel matrix is high, and the feedback of channel state information will occupy a large amount of feedback communication resources. At the same time, due to the high dimensionality of the channel matrix, the complexity of the algorithm increases sharply when the network device calculates the precoding matrix.

SUMMARY

The embodiments of the present disclosure provide a precoding model training method, a precoding method, and apparatus. The channel state information of K terminals is received through a network device, where K is an integer greater than zero. According to the channel state information, a precoding model DNet model is trained; where the DNet model includes a compression reconstruction submodel DiSNet model and a precoding submodel PreNet model, and the DiSNet model includes K groups of paired compression submodels and reconstruction submodels, and the precoding model DNet model may process the channel state information of a plurality of terminals in a distributed manner, so that the network device can perform efficient precoding design under the condition of limited feedback from the terminal.

In the first aspect, an embodiment of the present disclosure provides a precoding model training method, the method is executed by a network device, and the method includes: receiving, by the network device, channel state information of K terminals; where K is an integer greater than zero; and training a precoding model DNet model according to the channel state information; where the DNet model includes a compression reconstruction submodel DiSNet model and a precoding submodel PreNet model, and the DiSNet model includes K groups of paired compression submodels and reconstruction submodels.

In the second aspect, an embodiment of the present disclosure provides a precoding method, the method is executed by a network device, and the method includes: obtaining a precoding DNet model according to the precoding model training method described in some of the above embodiments; where the DNet model includes a channel compression reconstruction submodel DiSNet model and a precoding design submodel PreNet model; the DiSNet model includes K groups of paired compression submodels-reconstruction submodels; sending K compression submodels to K terminals in a distributed transmission manner; where K is an integer greater than zero; receiving compressed channel state information sent by k terminals among the K terminals; where k is an integer greater than zero and less than or equal to K; inputting the compressed channel state information into the DNet model to generate a corresponding hybrid precoding matrix.

In a third aspect, an embodiment of the present disclosure provides another precoding method, the method is executed by a terminal, and the method includes: receiving a compression submodel configured by a network device; inputting channel state information into the compression submodel to generate compressed channel state information, and sending the compressed channel state information to the network device.

In a fourth aspect, an embodiment of the present disclosure provides a precoding model training apparatus, the apparatus including: an information obtaining unit, configured to receive channel state information of K terminals; where K is an integer greater than zero; a model training unit, configured to train a precoding model DNet model according to the channel state information; where the DNet model includes a compression reconstruction submodel DiSNet model and a precoding submodel PreNet model, and the DiSNet model includes K groups of paired compression submodels and reconstruction submodels.

In the fifth aspect, the embodiment of the present disclosure provides a communication apparatus, which has some or all functions of the network device in the method described in the first aspect and the second aspect above, for example, the function of the communication apparatus may have the functions of some or all of the embodiments in the present disclosure, or may also have the functions of independently implementing any one of the embodiments in the present disclosure. The functions described above may be implemented by hardware, or may be implemented by executing corresponding software on the hardware. The hardware or software includes one or more units or modules corresponding to the above functions.

In the sixth aspect, an embodiment of the present disclosure provides another communication apparatus, which has part or all of the functions of the terminal device in the method example described in the third aspect above, for example, the functions of the communication apparatus may have the functions in some or all of the embodiments in the present disclosure, or may also have the function of independently implementing any one embodiment in the present disclosure. The functions described above may be implemented by hardware, or may be implemented by executing corresponding software on the hardware. The hardware or software includes one or more units or modules corresponding to the above functions.

In the seventh aspect, an embodiment of the present disclosure provides a communication apparatus, the communication apparatus includes a processor, and when the processor invokes a computer program in a memory, the methods described in the first aspect and the second aspect above are executed.

In the eighth aspect, an embodiment of the present disclosure provides a communication apparatus, the communication apparatus includes a processor, and when the processor invokes a computer program in a memory, the method described in the third aspect above is executed.

In the ninth aspect, an embodiment of the present disclosure provides a communication apparatus, the communication apparatus includes a processor and a memory, and a computer program is stored in the memory; the processor executes the computer program stored in the memory, so that the communication apparatus executes the method described in the first aspect and the second aspect above.

In the tenth aspect, an embodiment of the present disclosure provides a communication apparatus, the communication apparatus includes a processor and a memory, and a computer program is stored in the memory; the processor executes the computer program stored in the memory, so that the communication apparatus executes the method described in the third aspect above.

In the eleventh aspect, an embodiment of the present disclosure provides a communication apparatus, the apparatus includes a processor and an interface circuit, the interface circuit is configured to receive code instructions and transmit them to the processor, and the processor is configured to run the code instructions to enable the apparatus to execute the methods described in the first aspect and the second aspect above.

In the twelfth aspect, an embodiment of the present disclosure provides a communication apparatus, the apparatus includes a processor and an interface circuit, the interface circuit is configured to receive code instructions and transmit them to the processor, and the processor is configured to run the code instructions to enable the apparatus to execute the method described in the third aspect above.

In the thirteenth aspect, an embodiment of the present disclosure provides a communication system, the system includes the communication apparatus described in the fifth aspect and the communication apparatus described in the sixth aspect, or, the system includes the communication apparatus described in the seventh aspect and the communication apparatus described in the eighth aspect, or, the system includes the communication apparatus described in the ninth aspect and the communication apparatus described in the tenth aspect, or, the system includes the communication apparatus described in the eleventh aspect and the communication apparatus described in the twelfth aspect.

In the fourteenth aspect, an embodiment of the present disclosure provides a non-transitory computer-readable storage medium for storing instructions used by the above-mentioned terminal, and when the instructions are executed, the terminal executes the methods described in above-mentioned first aspect and second aspect.

In the fifteenth aspect, an embodiment of the present disclosure provides a readable storage medium for storing instructions used by the above-mentioned network device, and when the instructions are executed, the network device executes the method described in the above-mentioned third aspect.

In the sixteenth aspect, the present disclosure further provides a computer program product including a computer program, which, when running on a computer, causes the computer to execute the methods described in the above-mentioned first aspect and second aspect.

In the seventeenth aspect, the present disclosure further provides a computer program product including a computer program, which, when running on a computer, causes the computer to execute the method described in the above-mentioned third aspect.

In the eighteenth aspect, the present disclosure provides a chip system, the chip system includes at least one processor and an interface, for supporting the terminal to implement the functions involved in the first aspect and the second aspect, for example, determining or processing at least one of the data and information involved the above methods. In a possible design, the chip system further includes a memory, and the memory is configured to store necessary computer programs and data of the terminal. The chip system may consist of chips, or may include a chip and other discrete device(s).

In the nineteenth aspect, the present disclosure provides a chip system, the chip system includes at least one processor and an interface, for supporting the network device to implement the functions involved in the third aspect, for example, determining or processing at least one of the data and information involved in the above method. In a possible design, the chip system further includes a memory, and the memory is configured to store necessary computer programs and data of the network device. The chip system may consist of chips, or may include a chip and other discrete device(s).

In the twentieth aspect, the present disclosure provides a computer program that, when running on a computer, causes the computer to execute the methods described in the first aspect and the second aspect above.

In the twenty-first aspect, the present disclosure provides a computer program that, when running on a computer, causes the computer to execute the method described in the third aspect above.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 8 is a flowchart of a precoding method provided by an embodiment of the present disclosure;

FIG. 9 is a flowchart of another precoding method provided by an embodiment of the present disclosure;

5

Figures 12, 13:
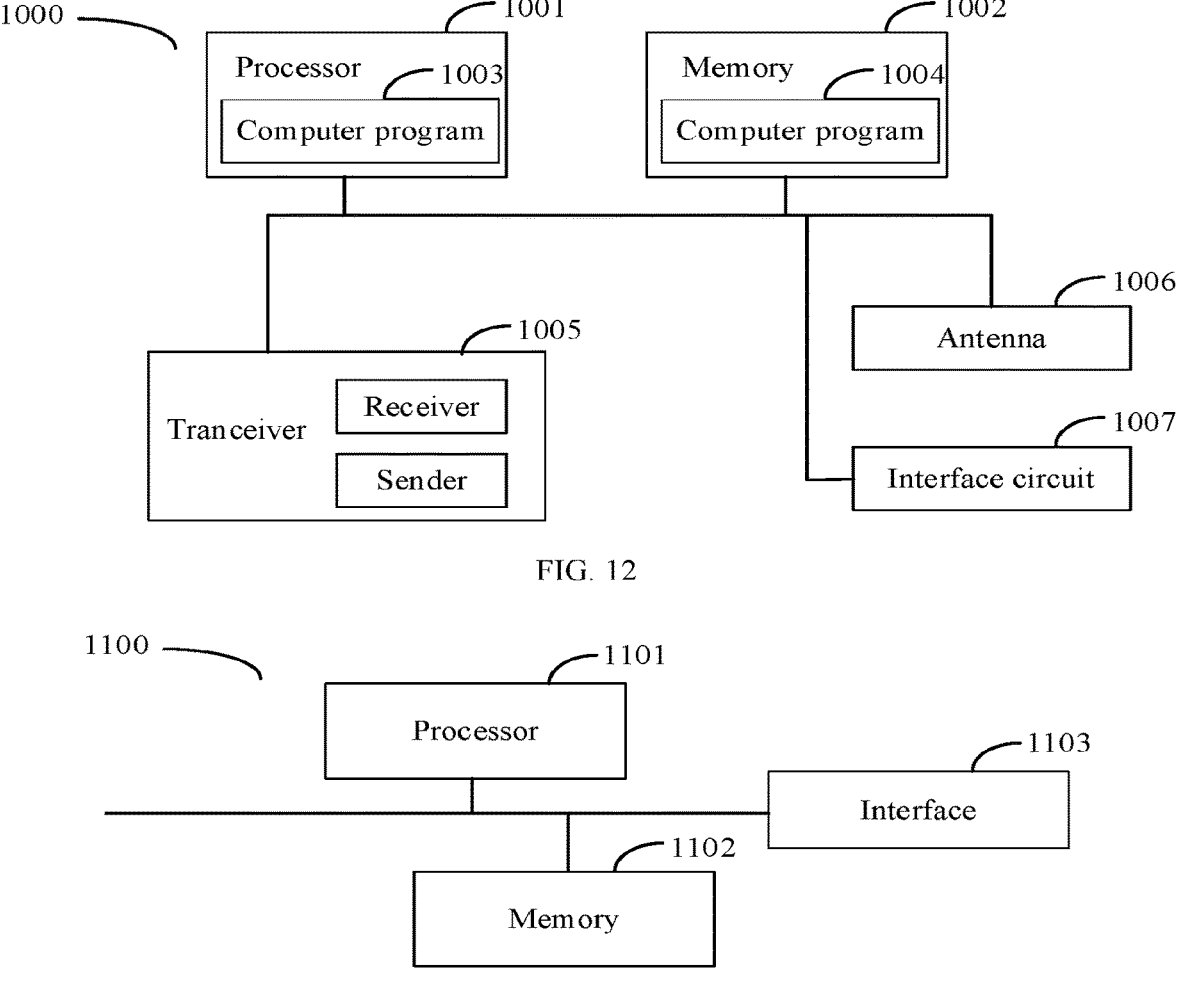

FIG. 10 is a structural diagram of a precoding model training apparatus provided by an embodiment of the present disclosure;

FIG. 11 is a structural diagram of a precoding apparatus provided by an embodiment of the present disclosure;

FIG. 12 is a structural diagram of a communication apparatus provided by an embodiment of the present disclosure; and FIG. 13 is a schematic structural diagram of a chip provided by an embodiment of the present disclosure.

DETAILED DESCRIPTION OF THE
PREFERRED EMBODIMENTS

Referring now to the drawings, wherein like reference numerals designate identical or corresponding parts throughout the several views.

In order to better understand a method for determining a duration of a side link disclosed in the embodiments of the present disclosure, the communication system to which the embodiments of the present disclosure are applicable is firstly described below.

Figure 1:
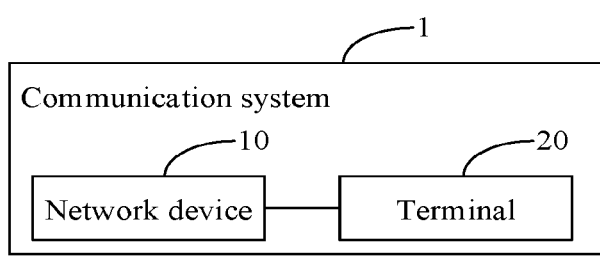
FIG. 1 is an architecture diagram of a communication system provided by an embodiment of the present disclosure.

FIG. 1 is referred to, which is a schematic structural diagram of a communication system provided by an embodiment of the present disclosure. The communication system may include, but is not limited to, one network device and one terminal. The number and form of the devices shown in FIG. 1 are for example only and do not constitute a limitation to the embodiments of the present disclosure. In practical applications, two or more network devices, two or more terminals may be included. The communication system shown in FIG. 1 includes one network device 10 and one terminal 20 as an example.

It should be noted that the technical solutions of the embodiments of the present disclosure may be applied to various communication systems, for example: a long term evolution (LTE) system, a 5th generation (5G) mobile communication system, a 5G new radio (NR) system, or other future new mobile communication systems, etc.

The network device 10 may be a base station, and the base station may be used to communicate with one or more terminals, or may be used to communicate with one or more base stations with partial terminal functions (such as communication between a macro base station and a micro base station). The base station may be a Base Transceiver Station (BTS) in a Time Division Synchronous Code Division Multiple Access (TD-SCDMA) system, or an Evolutional Node B (eNB) in an LTE system, and the next generation base station (next generation NodeB, gNB) in the 5G system and the NR system, the base station in other future mobile communication systems or the access node in the wireless fidelity (WiFi) system, etc. In addition, the network device provided by the embodiments of the present disclosure may be composed of a central unit (CU) and a distributed unit (DU), where the CU may also be called a control unit, and the structure of the CU-DU can separate the protocol layers of the network device, such as the base station. The functions of some protocol layers are centrally controlled by the CU, and the functions of the remaining part or all of the protocol layers are distributed in the DU, and the CU centrally controls the DU. Optionally, considering that the network device 10 may face a relatively great computing pressure, one server or one server cluster can be deployed for it to provide the computing capabilities for the network device 10 separately. At this time, the server or server cluster may be regarded as a part of the network device 10. The embodiments of the present disclosure do not limit the specific technology and specific device form adopted by the network device.

The terminal 20 can be distributed throughout the wireless communication system 1, and can be stationary or mobile, and the number of the terminal is usually multiple. The terminal 20 may include a handheld device with a wireless communication function (such as a mobile phone, a tablet computer, a palmtop computer, etc.), a vehicle-mounted device (such as a car, a bicycle, an electric vehicle, an airplane, a ship, etc.), a wearable device (such as a smart watch (such as iWatch, etc.), a smart bracelet, a pedometer, etc.), a smart home device (such as a refrigerator, a TV, an air conditioner, an electricity meter, etc.), a smart robot, a workshop equipment, other processing device that can connect to a wireless modem, and various forms of User Equipment (UE), Mobile station (MS), terminal, terminal equipment, and so on. The embodiments of the present disclosure do not limit the specific technology and specific device form adopted by the terminal.

In the communication system 1, a plurality of transmitting antennas are deployed on the transmitting end (e.g., the network device), and a plurality of receiving antennas are deployed on the receiving end (e.g., the terminal), thereby forming a Massive MIMO system.

It can be understood that the communication system described in the embodiments of the present disclosure is to illustrate the technical solutions of the embodiments of the present disclosure more clearly, and does not constitute a limitation on the technical solutions provided by the embodiments of the present disclosure. The person skilled in the art may know that with the evolution of the system architecture and the emergence of new service scenarios, the technical solutions provided by the embodiments of the present disclosure are also applicable to similar technical problems.

In related art, in order to find a low-complexity precoding design algorithm in the case of limited feedback, an m-MIMO precoding design method based on codebook search and a precoding design method based on machine learning are proposed.

The design method based on codebook search gives the analog precoding codebook in the hybrid precoding, and the optimal analog precoding is obtained by exhaustive search method, so as to obtain the equivalent low-dimensional channel and analog precoding codebook information on the baseband. However, the codebook compression method relies on exhaustive search, and the algorithm complexity is high. The precoding design method based on machine learning regards the channel state information between the network device and the terminal as picture information or language information, and finds the mapping relationship between the channel state information and the precoding matrix by using the convolutional neural networks (CNN) network or recurrent neural network (RNN) network to generate the corresponding precoding matrix and reduce the complexity of precoding calculation. However, most of the existing neural network algorithms are centralized networks, which fail to reduce the feedback bandwidth consumption between the terminal and the network device. At the same time, the precoding performance of the existing neural network algorithms is far from the theoretical optimal performance.

Based on this, an embodiment of the present disclosure proposes a precoding model training method, a precoding method and apparatus to solve the problem of high complexity of the existing precoding algorithm under the condition of limited feedback, and at the same time, to improve the spectral efficiency of the neural network for precoding design.

The precoding model training method, the precoding method and apparatus provided by the present disclosure will be described in detail below with reference to the accompanying drawings.

Figure 2:
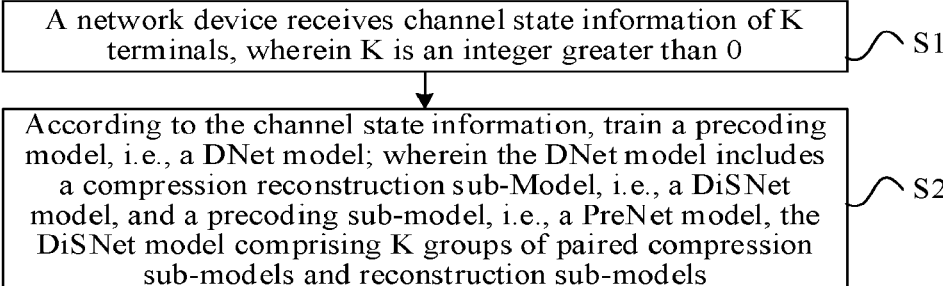
FIG. 2 is a flowchart of a precoding model training method provided by an embodiment of the present disclosure.

FIG. 2 is referred to, which is a flowchart of a precoding model training method provided by an embodiment of the present disclosure.

As shown in FIG. 2, the method is performed by a network device, and the method may include but not limited to the following steps.

In S1: the network device receives channel state information of K terminals; where K is an integer greater than zero. The channel state information may be, for example, downlink channel estimation information. A plurality of terminals obtain the downlink channel estimation information through a typical channel estimation method, and then send the downlink channel estimation information to the network device through the uplink channel.

In S2: according to the channel state information, a precoding model DNet model is trained; where the DNet model includes a compression reconstruction submodel DiSNet model and a precoding submodel PreNet model, and the DiSNet model includes K groups of paired compression submodels and reconstruction submodels. In the embodiment of the present disclosure, the DNet model includes a compression reconstruction submodel DiSNet model and a precoding submodel PreNet model, the DiSNet model performs distributed channel compression and reconstruction, and the PreNet model implements an efficient precoding design. The DiSNet model includes K groups of paired compression submodels and reconstruction submodels to perform distributed channel compression and reconstruction on the channel state information of K terminals. By compressing and reconstructing the received channel state information of each terminal, and then performing channel splicing processing, the distributed processing of the channel state information of a plurality of terminals is realized.

Through performing the embodiment of the present disclosure, the network device receives channel state information of K terminals, K being an integer greater than zero, and trains the precoding model DNet model according to the channel state information; where the DNet model includes a compression reconstruction submodel DiSNet model and a precoding submodel PreNet model, the DiSNet model includes K groups of paired compression submodels and reconstruction submodels, the precoding model DNet model can perform distributed processing of the channel state information of the plurality of terminals, and the network device can perform high-efficiency precoding design under limited feedback of the terminal.

In this technical solution, the precoding model DNet model can perform distributed processing on the channel state information of a plurality of terminals, so that in the case of limited feedback from the terminal, the network device can perform efficient precoding design.

Figure 3:
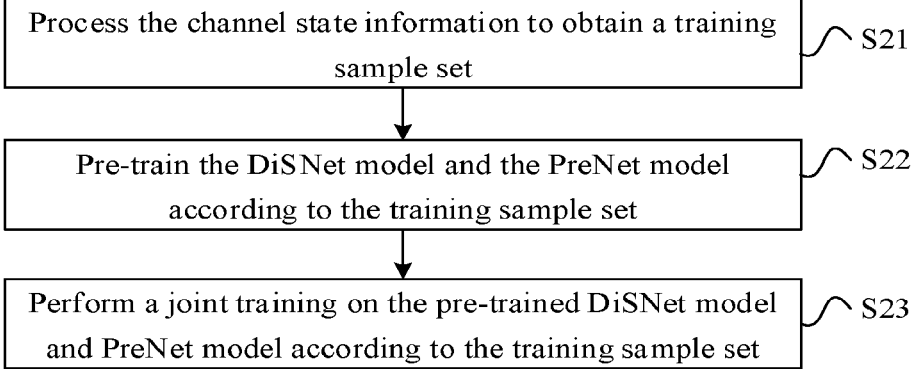
FIG. 3 is a flowchart of sub-steps of S2 in the precoding model training method provided by an embodiment of the present disclosure.

In some embodiments, as shown in FIG. 3, S2: training the DNet model according to the channel state information, includes the following steps.

In S21: the channel state information is processed to obtain a training sample set.

In S22: the DiSNet model and the PreNet model are pre-trained according to the training sample set.

In S23: the pre-trained DiSNet model and PreNet model are jointly trained according to the training sample set. In the embodiment of the present disclosure, for the DiSNet model and the PreNet model in the DNet model, first, the DiSNet model and the PreNet model are pre-trained according to the training sample set, and then the DiSNet model and the PreNet model are spliced into a complete DNet model for joint training, which can improve the precoding performance.

In some embodiments, S21: processing the channel state information to obtain a training sample set, includes: obtaining channel state information $\{h_1, \ldots, h_K\}$ of K terminals, and aggregating them into a matrix sample $$H = \{h_1^T, \ldots, h_K^T\}^T;$$

where K is an integer greater than 1;

$$h_K^T$$

represents the conjugate transpose of the channel state information of the K-th terminal; calculating the matrix sample to obtain an initial analog precoding matrix F and an initial digital precoding matrix W; obtaining the training sample set $\{(H, F, W)\}$ according to the matrix sample, the initial analog precoding matrix F and the initial digital precoding matrix W.

In an exemplary embodiment, in a downlink of an MIMO-OFDM (orthogonal frequency division multiplexing) system, on the network device side, Nt=64 antennas (8×8 antenna array) are configured at half-wavelength intervals in a uniform linear array (ULA) manner, and a single antenna is configured in the terminal, Nc=1024 subcarriers are adopted, 23040 channel state information (CSI) matrix samples are generated in the 2.4 GHz outdoor picocell scene, and divided into a training sample set (accounting for 90%) containing 20736 samples and a test sample set (accounting for 10%) containing 2304 samples. The training sample set H in the CSI matrix samples is decomposed into an imaginary part and a real part, that is, $H=H_{re}+j*H_{im}$, where $$j^2 = -1, H = \left[h_1^T, \ldots, h_K^T\right]^T.$$

Based on the precoding algorithm of zero forcing (ZF), the initial analog precoding matrix F and the initial digital precoding matrix W are calculated, and the training data set $\{(H, F, W)\}$ required for neural network training is obtained.

It should be noted that the calculation of the initial analog precoding matrix F and the initial digital precoding matrix W according to the training sample set based on the ZF precoding algorithm proposed in the above exemplary embodiment is only for illustration, and any other algorithm for calculating the initial analog precoding matrix F and the initial digital precoding matrix W can also be used for calculation, which is only used here as an illustration, and not as a specific limitation to the present disclosure.

Figure 4:
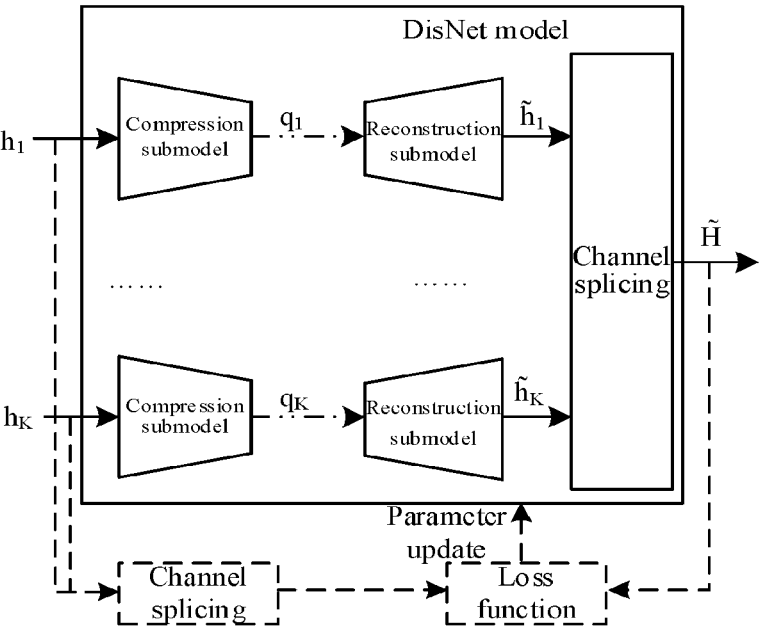
FIG. 4 is a structural diagram of DiSNet model pre-training in the precoding model training method provided by an embodiment of the present disclosure.

In some embodiments, as shown in FIG. 4, S23: pre-training the DiSNet model according to the training sample, includes:

K compression submodels compressing $\{h_1, \ldots, h_K\}$ in the training sample set into low-dimensional channel feature information $\{q_1, \ldots, q_K\}$; K reconstruction submodels reconstructing the low-dimensional channel feature information $\{q_1, \ldots, q_K\}$ as imperfect channel state information $\{\tilde{h}_1, \ldots, \tilde{h}_K\}$; splicing the imperfect channel state information $\{\tilde{h}_1, \ldots, \tilde{h}_K\}$ to generate an imperfect matrix $$\tilde{H} = \left[ \tilde{h}_1^T, \ldots, \tilde{h}_K^T \right]^T;$$

pre-training the compression submodel and the reconstruction submodel using the self-supervised learning and the adaptive moment estimation (Adam) optimization algorithm.

The DisNet model is pre-trained by the self-supervised learning and adaptive moment estimation (Adam) optimization algorithm, and the expression of the loss function satisfies the following relationship:

$$\text{Loss} = \frac{1}{K} \frac{1}{N_t} \left\| H - \tilde{H} \right\|_F^2 \tag{1}$$

Figure 5:
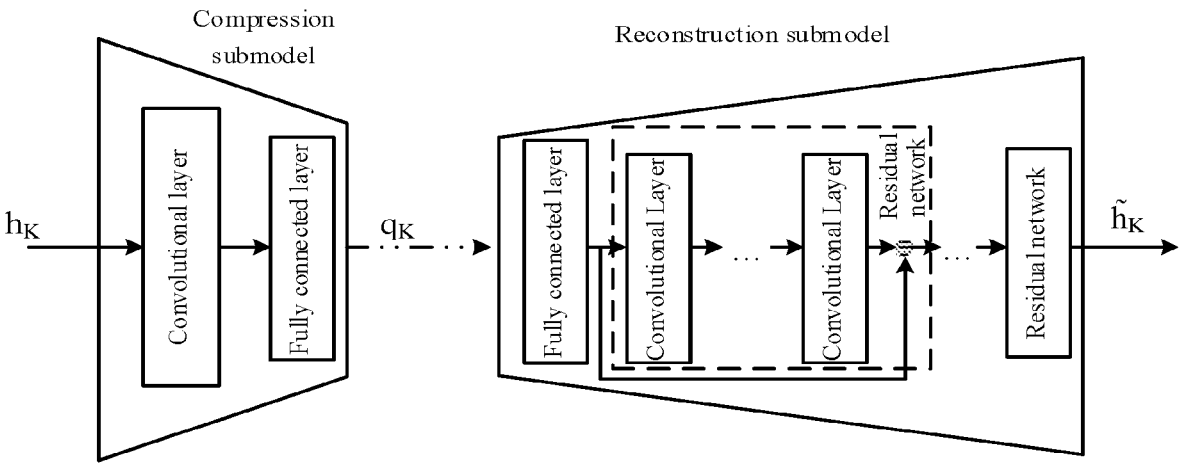
FIG. 5 is a structural diagram of a DiSNet model in the precoding model training method provided by an embodiment of the present disclosure.

In some embodiments, as shown in FIG. 5, K groups of paired compression submodels and reconstruction submodels have the same structure and are independent of each other; the compression submodel includes a convolutional layer and a fully connected layer, to extract and compress the channel state information; the reconstruction submodel includes a fully connected layer and a deep residual network, to reconstruct the compressed channel state information.

In an exemplary embodiment, each independent compression submodel includes a convolutional layer and a fully connected layer, and each independent reconstruction submodel includes a fully connected layer and a residual network. The input of the compression submodel is the channel state information $h_k$ corresponding to the K-th terminal, and the output is the low-dimensional channel feature code $q_k$. The input of the reconstruction submodel is the corresponding low-dimensional channel feature code $q_k$, and the output is the reconstructed imperfect channel state information $\tilde{h}_K$.

When inputting, the imaginary part and the real part of the channel state information are separated, that is, $$h_k = h_k^{re} + j * h_k^{im},$$

and at the same time, $$h_k^{re} \text{ and } h_k^{im}$$

are converted from $1 \times N_t$ vector to $\sqrt{N_t} \times \sqrt{N_t}$ matrix, and are inputted into the corresponding compression submodel-reconstruction submodel in the DisNet model.

The expression of the convolutional layer satisfies the following relationship:

$$y_{d,i,j} = \sum_c \sum_h \sum_w W_{d,c,h,w} x_{c,i \times s_i + h, j \times s_j + w} + b_d \tag{2}$$

Among them, $y_{d,i,j}$ is the (d, i, j)-th element in the convolution output y, $W_{d,c,h,w}$ is the (d, c, h, w)-th element in the convolution kernel weight matrix W, $b_d$ is the d-th element in the convolution kernel bias b, $x_{c,i*s_1+h,j*s_2+w}$ is the (c,i×s+h,j×t+w)-th element after convoluting the input x and then performing zero padding, s and t are the convolution step size, denoted as (s,t). The convolutional layer uses Tanh as an activation function, and its expression satisfies the following relationship:

$$\text{Tanh}(x) = \frac{e^x - e^{-x}}{e^x + e^{-x}} \tag{3}$$

All convolutional layers adopt the "same" zero padding strategy, the convolution step size is (1, 1), and the convolution kernel is $d_i \times c_i \times 3 \times 3$, satisfying the constraint of $d_{i-1} = c_i$. The final output size of the convolutional layer is $d_n \times \sqrt{N_t} \times \sqrt{N_t}$, where n is the number of convolutional layers.

The expression of the fully connected layer satisfies the following relationship:

$$y_i = \sum_j W_{i,j} x_i + b_i \tag{4}$$

Among them, $y_i$ is the i-th element in the fully connected output, $W_{i,j}$ is the (i, j)-th element in the fully connected weight matrix, $b_i$ is the i-th element in the fully connected bias, and $x_i$ is the i-th element in the fully connected input. The fully connected layer uses the ReLU function as the activation function, and its expression satisfies the following relationship:

$$ReLU(x) = \begin{cases} 0, & x < 0 \\ x, & x \geq 0 \end{cases} \tag{5}$$

The expression of the residual network satisfies the following relationship:

$$y = f_n(W_n f_{n-1}(W_{n-1} f_{n-2}(\ldots f_1(W_1 x + b_1) \ldots) + b_{n-1}) + b_n + x) \tag{6}$$

Among them, y is the output of the residual network, x is the input of the residual network, $W_i$ and $b_i$ are the weight and bias of the middle layer of the residual network, and $f_i(\cdot)$ is the activation function of the middle layer, specifically:

$$f_i(x) = \text{Leaky}ReLU(x, 0.3) = \begin{cases} -0.3 * x, & x < 0 \\ x, & x \geq 0 \end{cases} \tag{7}$$

The output size of the compression submodel is defined as M and the input size is defined as $N_t$, then the compression rate is $\gamma = M/N_t$. When $M < N_t$, $\gamma < 1$, and channel limited feedback is realized.

In the embodiment of the present disclosure, the reconstruction submodel adopts a deep residual network, which can avoid gradient disappearance and improve the accuracy of channel reconstruction.

Figure 6:
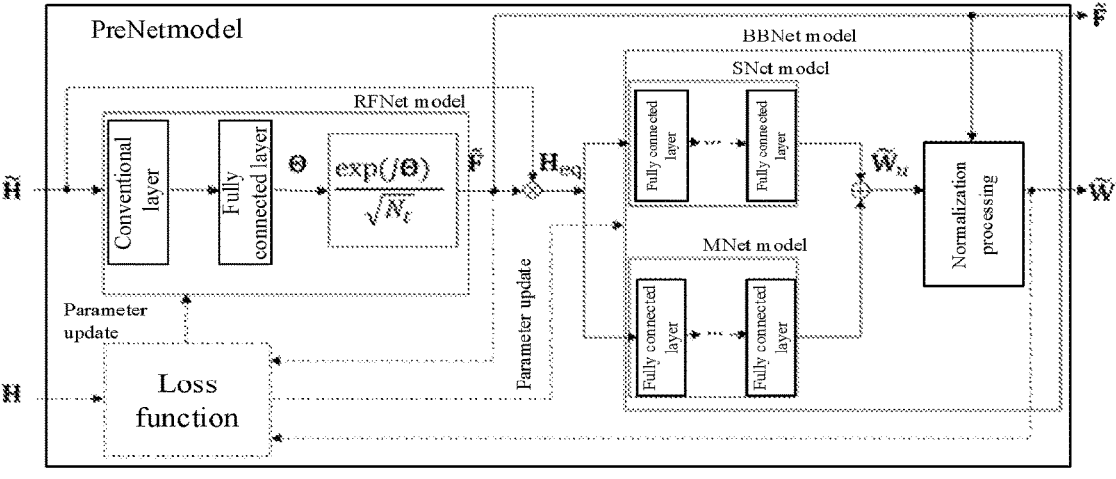
FIG. 6 is a structural diagram of PreNet model pre-training in the precoding model training method provided by an embodiment of the present disclosure.

In some embodiments, as shown in FIG. 6, the PreNet model includes: an analog precoding submodel RFNet model and a digital precoding submodel BBNet model; pre-training the PreNet model includes: inputting the imperfect matrix $\tilde{H}$ into the RFNet model to generate an analog precoding $\tilde{F}$; the BBNet model generating a digital precoding $\tilde{W}$ based on the imperfect matrix $\tilde{H}$; pre-training the RFNet model and BBNet model by self-supervised learning and Adam optimization algorithm.

The PreNet model is pre-trained by the supervised learning and the Adam optimization algorithm, and the expression of the loss function of RFNet satisfies the following relationship:

$$\text{Loss} = \frac{1}{K}\frac{1}{N_t}\left\|F - \tilde{F}\right\|_F^2 \tag{8}$$

In some embodiments, continuing to refer to FIG. 6, the BBNet model includes: a first initial digital submodel SNet model and a second initial digital submodel MNet model.

The BBNet model generating the digital precoding $\tilde{W}$ based on the imperfect matrix $\tilde{H}$ includes:

according to the analog precoding $\tilde{F}$ generated by inputting the imperfect matrix $\tilde{H}$ into the RFNet model, obtaining a diagonally dominant matrix $H_{eq}=\tilde{H}*\tilde{F}$ and a pivot matrix diag ($H_{eq}$), inputting the diagonally dominant matrix $H_{eq}=\tilde{H}*\tilde{F}$ and the pivot matrix diag ($H_{eq}$) into the SNet model and the MNet model, respectively, combining them and then performing normalization processing with the simulation precoding $\tilde{F}$ to generate the digital precoding $\tilde{W}$.

In the embodiment of the present disclosure, the RFNet model includes a convolutional layer and a fully connected layer, with a rectified linear unit (ReLU) as the activation function, and the processing formulas of the convolutional layer and the fully connected layer are the same as those in the above embodiment. The phase shifter angle $\Theta$ corresponding to the analog precoding $\tilde{F}$ is outputted:

$$\tilde{F} = \frac{\exp(j\Theta)}{\sqrt{N_t}} \tag{9}$$

Among them, $N_t$ is the number of antennas of the base station, the BBNet model includes two submodels of the SNet model and the Mnet model, the diagonally dominant matrix $H_{eq}=\tilde{H}*\tilde{F}$ and the pivot matrix diag ($H_{eq}$) are inputted into the SNet model and the Mnet model, respectively, and then are combined to output $\tilde{W}_u$ to the normalization module, and the digital precoding $\tilde{W}$ is outputted.

In the embodiment of the present disclosure, in addition to the traditional fully connected network, the BBNet model additionally constructs an MNet model for the special diagonally dominant matrix $H_{eq}=\tilde{H}*\tilde{F}$ with respect to the particularity of the input data, to increase the weight of the diagonally dominant matrix element $H_{eq}$ in the model and improve the precoding ability.

The expression of normalization satisfies the following relationship:

$$\tilde{W} = \frac{\sqrt{K}}{\left\|\tilde{F}\tilde{W}_u\right\|_F}\tilde{W}_u \tag{10}$$

Figure 7:
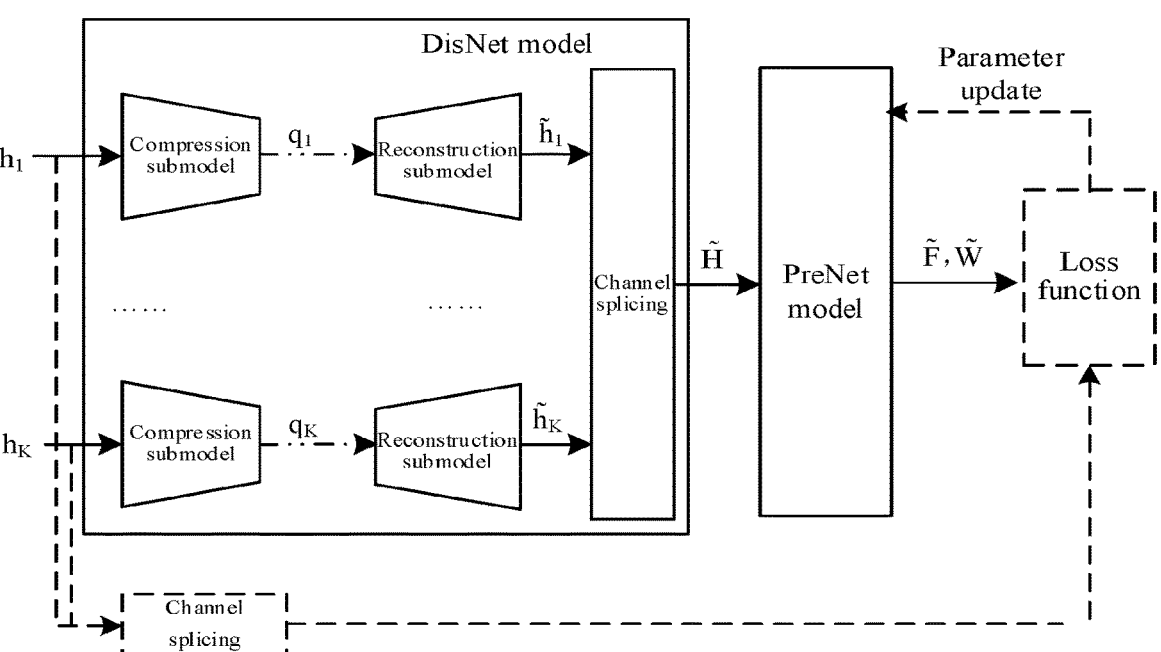
FIG. 7 is a structural diagram of joint training of the DNet model in the precoding model training method provided by an embodiment of the present disclosure.

In some embodiments, as shown in FIG. 7, performing joint training on the pre-trained DiSNet model and PreNet model according to the training sample set, includes: jointly training the pre-trained DiSNet model and PreNet model using Adam optimization algorithm and end-to-end learning.

The DiSNet model and the PreNet model are spliced into a DNet model for joint training. The DNet model adopts the Adam optimization algorithm and the end-to-end learning method to jointly train the DiSNet model and the PreNet model. The expression of the loss function satisfies the following relationship:

$$\text{Loss} = -\text{Rate} = -\sum_{k=1}^{K}\log_2(1 + SINR_k) \tag{11}$$

$$SINR_k = \frac{\left|h_k^H \tilde{F}\tilde{w}_k\right|^2}{1 + \sum_{j\neq k}\frac{P}{K}\left|h_k^H \tilde{F}\tilde{w}_j\right|^2} \tag{12}$$

In some embodiments, the test sample set HS is decomposed into an imaginary part and a real part, that is, $HS=HS_{re}+j*HS_{im}$, where $$j^2 = -1, HS = \left[h_{S1}^T, \dots, h_{SK}^T\right]^T$$

is divided into $$hs_1^{re}, hs_k^{re}, \cdots, hs_K^{re} \text{ and } hs_1^{im}, hs_1^{im}, \cdots, hs_K^{im},$$

and they are inputted into the trained DNet model to obtain the corresponding output analog precoding matrix FS and digital precoding matrix WS.

The analog precoding matrix FS and the digital precoding matrix WS obtained by processing of the DNet model according to the test sample set HS are analyzed, which can assist in judging the model training results.

FIG. 8 is referred to, which is a flowchart of a precoding method provided by an embodiment of the present disclosure.

As shown in FIG. 8, the precoding method provided by the embodiment of the present disclosure is executed by a network device, and the method includes, but is not limited to, the following steps.

In S10: according to the precoding model training method in the above embodiment, a precoding DNet model is obtained; where the DNet model includes a channel compression reconstruction submodel DiSNet model and a precoding design submodel PreNet model; the DiSNet model includes K groups of paired compression submodels-reconstruction submodels, K compression submodels are sent to K terminals in a distributed transmission manner; where K is an integer greater than 0.

It can be understood that in the embodiments of the present disclosure, the terminal obtains the DNet model according to the precoding model training methods in some of the above embodiments, and the precoding model training methods can refer to the descriptions in the above embodiments, and will not be repeated here.

In the embodiment of the present disclosure, the network device sends K compression submodels in K groups of paired compression submodels-reconstruction submodels of the DiSNet model to K terminals in a distributed transmission manner; where K is an integer greater than zero.

It should be noted that, in the precoding model training method, K groups of paired compression submodels and reconstruction submodels of the DiSNet model obtained by the network device according to the received channel state information of K terminals can be configured on K terminals in a distributed manner, thus, the DNet model can be deployed on K terminals in a distributed manner to build a distributed network architecture. Moreover, the DNet model can be deployed on the terminal and the network device at the same time, which can realize limited feedback of channels on the terminal and efficient precoding design on the network device.

In S20: compressed channel state information sent by k terminals among the K terminals is received; where k is an integer greater than zero and less than or equal to K.

In the embodiment of the present disclosure, the network device includes K reconstruction submodels, and the K compression submodels are configured on the K terminals in a distributed manner, so that the network device can receive the compressed channel state information of the K terminals. In the embodiment of the present disclosure, the network device may also receive the compressed channel state information sent by k terminals among the K terminals, where k is an integer greater than zero and less than or equal to K.

In S30: the compressed channel state information is inputted into the DNet model to generate a corresponding hybrid precoding matrix.

When k is greater than zero and less than K, the data in the reconstruction submodel(s) in the K reconstruction submodels of the network device that is not corresponding to the k terminals is set to zero, so that the K reconstruction submodels of the DiSNet model and the PreNet model in the network device can process the compressed channel information sent by k terminals and generate the corresponding hybrid precoding matrix.

By implementing the embodiments of the present disclosure, the network device obtains the precoding DNet model according to the precoding model training method in the above embodiment; where the DNet model includes the channel compression reconstruction submodel DiSNet model and the precoding design submodel PreNet model; the DiSNet model includes K groups of paired compression submodels-reconstruction submodels, and the K compression submodels are sent to K terminals in a distributed transmission manner; where K is an integer greater than 0; the compressed channel state information sent by k terminals among K terminal is received; where k is an integer greater than zero and less than or equal to K; the compressed channel state information is input into the DNet model to generate a corresponding hybrid precoding matrix. Therefore, the DNet model is deployed on the network device and is deployed on the terminal in a distributed manner at the same time, which can realize the limited feedback of the channel on the terminal and the efficient precoding design on the network device.

In some embodiments, inputting the compressed channel state information into the DNet model to generate a corresponding hybrid precoding matrix, includes but not limited to the following steps: the reconstruction submodel reconstructing the compressed channel state information to generate an imperfect channel state information; then splicing to generate an imperfect matrix $\tilde{H}$; inputting the imperfect matrix $\tilde{H}$ into the PreNet model to generate an analog precoding matrix $\tilde{F}$ and digital precoding matrix $\tilde{W}$.

In some embodiments, the PreNet model includes: an analog precoding submodel RFNet model and a digital precoding submodel BBNet model; and inputting the imperfect matrix $\tilde{H}$ to the PreNet model to generate an analog precoding matrix $\tilde{F}$ and a digital precoding matrix $\tilde{W}$ includes: inputting the imperfect matrix $\tilde{H}$ into the RFNet model to generate an analog precoding matrix $\tilde{F}$; inputting the imperfect matrix $\tilde{H}$ into the BBNet model to generate a digital precoding matrix $\tilde{W}$.

In some embodiments, the BBNet model includes: a first digital submodel SNet model and a second digital submodel MNet model; and inputting the imperfect matrix $\tilde{H}$ to the BBNet model to generate a digital precoding matrix $\tilde{W}$ includes: obtaining a diagonally dominant matrix $H_{eq}=\tilde{H}*\tilde{F}$ and a pivot matrix diag $(H_{eq})$ according to the imperfect matrix $\tilde{H}$; inputting the diagonally dominant matrix $H_{eq}=\tilde{H}*\tilde{F}$ and the pivot matrix diag $(H_{eq})$ into the SNet model and the MNet model, respectively, and after combining them, performing normalization processing with the imperfect matrix $\tilde{H}$ to generate a digital precoding matrix $\tilde{W}$.

In some embodiments, the DiSNet model includes a plurality of paired compression submodels-reconstruction submodels with identical structures and independent to each other; the compression submodel includes a convolutional layer and a fully connected layer, for extracting and compressing the channel state information; the reconstruction submodel includes a fully connected layer and a deep residual network, for reconstructing the compressed channel state information.

In some embodiments, the RFNet model includes a convolutional layer and a fully connected layer, with the rectified linear unit (ReLU) function as the activation function, and according to the imperfect matrix $\tilde{H}$, a transposition angle corresponding to the analog precoding matrix $\tilde{F}$ is generated, and then the analog precoding matrix $\tilde{F}$ is obtained by calculation.

The precoding method in the embodiment of the present disclosure has been described in detail in the above-mentioned precoding model training method, and reference may be made to the description in the above-mentioned precoding model training method, which will not be repeated here.

It should be noted that the precoding method in the embodiment of the present disclosure directly uses the trained DNet model, and for the DNet model training, the self-supervised learning and Adam optimization algorithm being used for pre-training the RFNet model and the BBNet model, and the joint training of the pre-trained DiSNet model and the PreNet model by using the Adam optimization algorithm and end-to-end learning are no longer applicable, and the content of this part is not included in the precoding method in the embodiment of the present disclosure.

FIG. 9 is referred to, which is a flowchart of another precoding method provided by an embodiment of the present disclosure.

As shown in FIG. 9, the precoding method provided by the embodiment of the present disclosure is executed by the terminal, and the method includes, but is not limited to, the following steps.

In S100: a compression submodel configured by a network device is received.

In S200: channel state information is input into the compression submodel, and compressed channel state information is generated and sent to the network device.

It can be understood that only when the terminal receives the compression submodel configured by the network device, the terminal can use the compression submodel to compress the channel state information, thereby generating the compressed channel state information, and further, sending it to the network device.

By implementing the embodiments of the present disclosure, the terminal device receives the compression submodel configured by the network device; inputs the channel state information into the compression submodel to generate compressed channel state information, and sends it to the network device. Therefore, the DNet model is deployed on the network device and is deployed on the terminals in a distributed manner at the same time, which can realize the limited feedback of the channel on the terminal, so as to realize the efficient precoding design on the network device.

In the above embodiments provided in the present disclosure, the methods provided in the embodiments of the present disclosure are introduced from the perspectives of the network device and the terminal, respectively. In order to implement the various functions in the method provided by the above embodiments of the present disclosure, the network device and the terminal may include a hardware structure and a software module, and the above functions are implemented in the form of a hardware structure, a software module, or a hardware structure plus a software module. A certain function among the above-mentioned functions may be implemented in the form of a hardware structure, a software module, or a hardware structure plus a software module.

FIG. 10 is referred to, which is a structural diagram of a precoding model training apparatus provided by an embodiment of the present disclosure.

As shown in FIG. 10, the precoding model training apparatus 100 provided by the embodiment of the present disclosure includes: an information obtaining unit 101 and a model training unit 102.

The information obtaining unit 101 is configured to receive channel state information of K terminals, where K is an integer greater than zero.

The model training unit 102 is configured to train a precoding model DNet model according to the channel state information; where the DNet model includes a compression reconstruction submodel DiSNet model and a precoding submodel PreNet model, and the DiSNet model includes K groups of paired compression submodels and reconstruction submodels.

With regard to the precoding model training apparatus 100 in the above embodiment, the specific manner in which each module performs operations has been described in detail in the embodiments related to the method, and will not be described in detail here. The precoding model training apparatus 100 provided in the above embodiments of the present disclosure achieves the same or similar beneficial effects as the precoding model training methods provided in some of the above embodiments, which will not be repeated here.

FIG. 11 is referred to, which is a structural diagram of a precoding apparatus provided by an embodiment of the present disclosure.

The precoding apparatus 70 shown in FIG. 11 may include a transceiver module 701 and a processing module 702. The transceiver module 701 may include a sending module and/or a receiving module, the sending module is configured to realize the sending function, the receiving module is configured to realize the receiving function, and the transceiver module 701 can realize the sending function and/or the receiving function.

The precoding apparatus 70 may be a terminal, may also be an apparatus in the terminal, and may also be an apparatus that can be matched and used with the terminal. Alternatively, the precoding apparatus 70 may be a network device, may also be an apparatus in the network device, and may also be an apparatus that can be matched and used with the network device.

The precoding apparatus 70 is the network device: the transceiver module 701 is configured to obtain a precoding DNet model according to the precoding model training method described in some embodiments above; where the DNet model includes a channel compression reconstruction submodel DiSNet model and a precoding design submodel PreNet model; the DiSNet model includes K groups of paired compression submodels-reconstruction submodels; the K compression submodels are sent to K terminals in a distributed transmission manner; where K is an integer greater than 0; receive compressed channel state information sent by k terminals in the K terminals; where k is an integer greater than zero and less than or equal to K; the processing module 702 is configured to input the compressed channel state information into the DNet model to generate a corresponding hybrid precoding matrix.

The precoding apparatus 70 is a terminal: the transceiver module 701 is configured to receive the compression submodel configured by the network device; the processing module 702 is configured to input the channel state information into the compression submodel, generate compressed channel state information, and send it to the network device.

Regarding the precoding apparatus 70 in the above embodiment, the specific manner in which each module executes operations has been described in detail in the embodiments of the method, and will not be described in detail here. The precoding apparatus 70 provided in the above embodiments of the present disclosure achieves the same or similar beneficial effects as the precoding methods provided in some of the above embodiments, and will not be repeated here.

FIG. 12 is referred to, which is a schematic structural diagram of another communication apparatus 1000 provided by an embodiment of the present disclosure.

The communication apparatus 1000 may be a network device, or a terminal, or a chip, a chip system, a processor, or the like that supports the network device to implement the above method, or a chip, a chip system, a processor, or the like that supports the terminal to implement the above method. The apparatus can be used to implement the methods described in the above method embodiments, and for details, the descriptions in the above method embodiments may be referred to.

The communication apparatus 1000 may include one or more processors 1001. The processor 1001 may be a general purpose processor or a special purpose processor or the like. For example, it can be a baseband processor or a central processing unit. The baseband processor can be used to process the communication protocols and communication data, and the central processing unit can be used to control the communication apparatus (such as the base station, the baseband chip, the terminal, the terminal device chip, DU or CU, etc.), execute the computer programs, and process data of the computer programs.

Optionally, the communication apparatus 1000 may further include one or more memories 1002, on which a computer program 1004 may be stored, and the memory 1002 executes the computer program 1004, so that the communication apparatus 1000 executes the methods described in the foregoing method embodiments. Optionally, data may also be stored in the memory 1002. The communication apparatus 1000 and the memory 1002 can be set separately or integrated together.

Optionally, the communication apparatus 1000 may further include a transceiver 1005 and an antenna 1006. The transceiver 1005 may be called a transceiver unit, a transceiver, or a transceiver circuit, etc., and is used to implement a transceiver function. The transceiver 1005 may include a receiver and a transmitter, and the receiver may be called a receiver or a receiving circuit for realizing a receiving function; the transmitter may be called a sender or a sending circuit for realizing a sending function.

Optionally, the communication apparatus 1000 may further include one or more interface circuits 1007. The interface circuit 1007 is used to receive code instructions and transmit them to the processor 1001. The processor 1001 runs the code instructions to enable the communication apparatus 1000 to execute the methods described in the foregoing method embodiments.

The communication apparatus 1000 is the network device: the transceiver 1005 is used to execute S10 and S20 in FIG. 8. The processor 1001 is configured to execute S30 in FIG. 8.

In an implementation, the structure of the communication apparatus may include a transceiver module and a processing module, and the processing module is configured to support the communication apparatus to perform the corresponding functions in the foregoing method. The transceiver module is configured to support communication between the communication apparatus and other device(s). The communication apparatus may further include a storage module, which is configured to be coupled with the transceiver module and the processing module, and store necessary computer programs and data of the communication apparatus.

The transceiver module is configured to obtain a precoding DNet model according to the precoding model training method as described in some of the above embodiments; where the DNet model includes a channel compression reconstruction submodel DiSNet model and a precoding design submodel PreNet model; the DiSNet model includes K groups of paired compression submodels-reconstruction submodels; send the K compression submodels to K terminals in a distributed transmission manner; where K is an integer greater than 0; receive compressed channel state information sent by k terminals among the K terminals; where k is an integer greater than zero and less than or equal to K; the processing module is configured to input the compressed channel state information into the DNet model to generate a corresponding hybrid precoding matrix.

The communication apparatus 1000 is the terminal: the transceiver 1005 is used to execute S100 in FIG. 9. The processor 1001 is configured to execute S200 in FIG. 9.

In an implementation, the structure of the communication apparatus may include a transceiver module and a processing module, and the processing module is configured to support the communication apparatus to perform the corresponding functions in the foregoing method. The transceiver module is configured to support communication between the communication apparatus and other device(s). The communication apparatus may further include a storage module, which is configured to be coupled with the transceiver module and the processing module, and store necessary computer programs and data of the communication apparatus.

In an implementation, the communication apparatus includes: a transceiver module, configured to receive a compression submodel configured by a network device; a processing module, configured to input channel state information into the compression submodel to generate compressed channel state information, and send the compressed channel state information to the network device.

In an implementation manner, the processor 1001 may include a transceiver for implementing receiving and sending functions. For example, the transceiver may be a transceiver circuit, or an interface, or an interface circuit. The transceiver circuit, interface or interface circuit for realizing the functions of receiving and sending can be separated or integrated together. The above-mentioned transceiver circuit, interface or interface circuit may be used for reading and writing code/data, or the above-mentioned transceiver circuit, interface or interface circuit may be used for signal transmission or transfer.

In an implementation manner, the processor 1001 may store a computer program 1003, and the computer program 1003 runs on the processor 1001 to enable the communication apparatus 1000 to execute the methods described in the foregoing method embodiments. The computer program 1003 may be solidified in the processor 1001, and in this case, the processor 1001 may be implemented by hardware.

In an implementation manner, the communication apparatus 1000 may include a circuit, and the circuit may implement the function of sending or receiving or communicating in the foregoing method embodiments. The processor and the transceiver described in the present disclosure can be implemented on the integrated circuit (IC), the analog IC, the radio frequency integrated circuit (RFIC), the mixed signal IC, the application specific integrated circuit (ASIC), the printed circuit board (PCB), the electronic device, etc. The processor and the transceiver can also be fabricated using various IC process technologies, such as complementary metal oxide semiconductor (CMOS), nMetal-oxide-semiconductor (NMOS), P-type Metal oxide semiconductor (positive channel metal oxide semiconductor, PMOS), bipolar junction transistor (BJT), bipolar CMOS (BiCMOS), silicon germanium (SiGe), gallium arsenide (GaAs), etc.

The communication apparatus described in the above embodiments may be a terminal, but the scope of the communication apparatus described in the present disclosure is not limited thereto, and the structure of the communication apparatus may not be limited by FIG. 12. The communication apparatus may be a stand-alone device or may be part of a relatively large device. For example, the communication apparatus may be:

(1) a stand-alone integrated circuit (IC), or a chip, or a chip system or a subsystem;

(2) a set with one or more ICs, optionally, the set of ICs may also include a storage component for storing data and the computer program;

(3) ASIC, such as a modem;

(4) a module that can be embedded in other device;

(5) a receiver, a terminal device, an intelligent terminal device, a cellular phone, a wireless device, a handset, a mobile unit, a vehicle device, a network device, a cloud device, an artificial intelligence device, etc.;

(6) others and so on.

For the case where the communication apparatus may be a chip or a chip system, FIG. 6 is referred to, which is a structural diagram of a chip provided in an embodiment of the present disclosure.

As shown in FIG. 13, a chip 1100 includes a processor 1101 and an interface 1103. The number of the processor 1101 may be one or more, and the number of the interface 1103 may be more than one.

For the case where the chip is used to implement the functions of the terminal in the embodiments of the present disclosure:

the interface 1103 is configured to receive code instructions and transmit them to the processor.

The processor 1101 is configured to run the code instructions to execute the precoding method as described in some of the above embodiments.

For the case where the chip is used to implement the functions of the network device in the embodiments of the present disclosure:

the interface 1103 is configured to receive code instructions and transmit them to the processor.

The processor 1101 is configured to run the code instructions to execute the precoding method as described in some of the above embodiments.

Optionally, the chip 1100 also includes a memory 1102 for storing necessary computer programs and data.

Those skilled in the art can also understand that various illustrative logical blocks and steps listed in the embodiments of the present disclosure can be implemented by an electronic hardware, computer software, or a combination of both. Whether such functions are implemented by hardware or software depends on the specific application and the design requirements of the overall system. Those skilled in the art may use various methods to implement the described functions for each specific application, but such implementation should not be understood as going beyond the protection scope of the embodiments of the present disclosure.

The present disclosure also provides a readable storage medium on which instructions are stored, and when the instructions are executed by a computer, the functions of any one of the above method embodiments are realized.

The present disclosure also provides a computer program product, which implements the functions of any one of the above method embodiments when the computer program product is executed by a computer.

In the above embodiments, all or part of them may be implemented by software, hardware, firmware or any combination thereof. When implemented using software, it may be implemented in whole or in part in the form of a computer program product. The computer program product includes one or more computer programs. When the computer program is loaded and executed on the computer, all or part of the processes or functions according to the embodiments of the present disclosure are generated. The computer can be a general purpose computer, a special purpose computer, a computer network, or other programmable apparatuses. The computer program can be stored in the non-transitory computer-readable storage medium or transmitted from one computer-readable storage medium to another computer-readable storage medium, for example, the computer program can be transmitted from one website, computer, server or data center to another website site, computer, server or data center by wired (such as a coaxial cable, an optical fiber, a digital subscriber line (DSL)) or wireless (such as infrared, wireless, microwave, etc.) manner. The non-transitory computer-readable storage medium may be any available medium that can be accessed by a computer, or a data storage device such as a server or a data center integrated with one or more available media. The available medium may be a magnetic medium (for example, a floppy disk, a hard disk, a magnetic tape), an optical medium (for example, a digital video disc (DVD)), or a semiconductor medium (for example, a solid state disk (SSD)), etc.

Throughout the specification and claims, unless the context requires otherwise, the term "comprise" and other forms such as the third person singular "comprises" and the present participle "comprising" are interpreted as the meaning of openness and inclusion, that is, "including, but not limited to". In the description of the specification, the terms "some embodiments", "exemplary embodiments" and the like are intended to indicate that the specific features, structures, materials or characteristics related to the embodiments or examples are included in at least one embodiment or example in the present disclosure. The schematic representations of the above terms are not necessarily referring to the same embodiment or example. Furthermore, the particular features, structures, materials or characteristics described may be included in any suitable manner in any one or more embodiments or examples.

Those of ordinary skill in the art can understand that the first, second, and other numbers involved in the present disclosure are only for convenience of description, and are not used to limit the scope of the embodiments of the present disclosure, and also indicate the sequence.

At least one in the present disclosure can also be described as one or more, and a plurality of can be two, three, four or more, which is not limited in the present disclosure. In the embodiments of the present disclosure, for a technical feature, the technical features are distinguished by "first", "second", "third", "A", "B", "C" and "D", etc. The technical features described by the "first", "second", "third", "A", "B", "C" and "D" have no sequence or order therebetween. "A and/or B" includes the following three combinations: A only, B only, and a combination of A and B.

Those skilled in the art can appreciate that the units and algorithm steps of the examples described in conjunction with the embodiments disclosed herein can be implemented by an electronic hardware, or a combination of computer software and the electronic hardware. Whether these functions are executed by hardware or software depends on the specific application and design constraints of the technical solution. Skilled artisans may implement the described functions using different methods for each particular application, but such implementation should not be considered as going beyond the scope of the present disclosure.

Those skilled in the art can clearly understand that for the convenience and brevity of the description, the specific working process of the above-described system, apparatus and unit can refer to the corresponding process in the foregoing method embodiment, which will not be repeated here.

The above is only the specific implementation of the present disclosure, but the scope of protection of the present disclosure is not limited thereto. Anyone skilled in the art can easily think of changes or substitutions within the technical scope of the present disclosure, which should fall within the protection scope of the present disclosure. Therefore, the protection scope of the present disclosure should be determined by the protection scope of the claims.

Obviously, numerous modifications and variations of the present invention are possible in light of the above teachings. It is therefore to be understood that within the scope of the appended claims, the invention may be practiced otherwise than as specifically described herein.

What is claimed is:

1. A precoding model training method, wherein the method is executed by a network device, and the method comprises:

receiving, by the network device, channel state information of K terminals; wherein K is an integer greater than zero; and training a precoding model DNet model according to the channel state information; wherein the DNet model comprises a compression reconstruction submodel DiSNet model and a precoding submodel PreNet model, and the DiSNet model comprises K groups of paired compression submodels and reconstruction submodels.

2. The method according to claim 1, wherein training the precoding model according to the channel state information comprises:

processing the channel state information to obtain a training sample set;

pre-training the DiSNet model and the PreNet model according to the training sample set;

performing a joint training on the pre-trained DiSNet model and PreNet model according to the training sample set.

3. The method according to claim 2, wherein processing the channel state information to obtain the training sample set comprises:

obtaining the channel state information $\{h_1, \ldots, h_K\}$ of K terminals and aggregating the channel state information $\{h_1, \ldots, h_K\}$ into a matrix sample $$H = \{h_1^T, \ldots, h_K^T\}^T,$$

wherein $$h_K^T$$

represents a conjugate transpose of the channel state information of a K-th terminal;

calculating the matrix sample to obtain an initial analog precoding matrix F and an initial digital precoding matrix W;

obtaining the training sample set $\{(H, F, W)\}$ according to the matrix sample, the initial analog precoding matrix F and the initial digital precoding matrix W.

4. The method according to claim 3, wherein pre-training the DiSNet model according to the training sample set comprises:

compressing $\{h_1, \ldots, h_K\}$ in the training sample set into low-dimensional channel feature information $\{q_1, \ldots, q_K\}$ by the K compression submodels;

reconstructing the low-dimensional channel feature information $\{q_1, \ldots, q_K\}$ into imperfect channel state information $\{\tilde{h}_1, \ldots, \tilde{h}_K\}$ by the K reconstruction submodels;

splicing the imperfect channel state information $\{\tilde{h}_1, \ldots, \tilde{h}_K\}$ to generate an imperfect matrix $$\tilde{H} = \left[\tilde{h}_1^T, \ldots, \tilde{h}_K^T\right]^T;$$

pre-training the compression submodel and the reconstruction submodel by self-supervised learning and adaptive moment estimation (Adam) optimization algorithm.

5. The method according to claim 4, wherein the K groups of paired compression submodels and reconstruction submodels are identical in structure and independent of each other;

the compression submodel comprises a convolutional layer and a fully connected layer, for extracting and compressing the channel state information;

the reconstruction submodel comprises a fully connected layer and a deep residual network, for reconstructing the compressed channel state information.

6. The method according to claim 4, wherein the PreNet model comprises: an analog precoding submodel RFNet model and a digital precoding submodel BBNet model;

pre-training the PreNet model comprises:

inputting the imperfect matrix $\tilde{H}$ into the RFNet model to generate an analog precoding $\tilde{F}$;

generating a digital precoding $\tilde{W}$ according to the imperfect matrix $\tilde{H}$ by the BBNet model;

pre-training the RFNet model and the BBNet model by the self-supervised learning and Adam optimization algorithm.

7. The method according to claim 6, wherein the BBNet model comprises: a first initial digital submodel SNet model and a second initial digital submodel MNet model;

generating the digital precoding $\tilde{W}$ according to the imperfect matrix $\tilde{H}$ by the BBNet model comprises:

according to the analog precoding $\tilde{F}$ generated by inputting the imperfect matrix $\tilde{H}$ into the RFNet model, obtaining a diagonally dominant matrix $H_{eq}=\tilde{H}*\tilde{F}$ and a pivot matrix $\text{diag}(H_{eq})$;

inputting the diagonally dominant matrix $H_{eq}=\tilde{H}*\tilde{F}$ and the pivot matrix diag $(H_{eq})$ into the SNet model and the MNet model, respectively, combining them and then performing a normalization processing with the analog precoding $\tilde{F}$ to generate the digital precoding $\tilde{W}$.

8. The method according to claim 7, wherein performing the joint training on the pre-trained DiSNet model and the PreNet model according to the training sample set comprises:

jointly training the pre-trained DiSNet model and PreNet model by using an Adam optimization algorithm and an end-to-end learning.

9. A precoding method, wherein the method is performed by a network device, and the method comprises:

obtaining a precoding DNet model according to the precoding model training method according to claim 1;

wherein the DNet model comprises a channel compression reconstruction submodel DiSNet model and a precoding design submodel PreNet model; the DiSNet model comprises K groups of paired compression submodels-reconstruction submodels; sending the K compression submodels to K terminals in a distributed transmission manner; wherein K is an integer greater than zero;

receiving compressed channel state information sent by k terminals among the K terminals; wherein k is an integer greater than zero and less than or equal to K;

inputting the compressed channel state information into the DNet model to generate a corresponding hybrid precoding matrix.

10. The method according to claim 9, wherein inputting the compressed channel state information into the DNet model to generate the corresponding hybrid precoding matrix comprises:

reconstructing the compressed channel state information to generate imperfect channel state information by the reconstruction submodel; then splicing them to generate an imperfect matrix $\tilde{H}$;

inputting the imperfect matrix $\tilde{H}$ into the PreNet model to generate an analog precoding matrix $\tilde{F}$ and a digital precoding matrix $\tilde{W}$.

11. The method according to claim 10, wherein the PreNet model comprises: an analog precoding submodel RFNet model and a digital precoding submodel BBNet model;

inputting the imperfect matrix $\tilde{H}$ into the PreNet model to generate the analog precoding matrix $\tilde{F}$ and the digital precoding matrix $\tilde{W}$ comprises:

inputting the imperfect matrix $\tilde{H}$ into the RFNet model to generate the analog precoding matrix $\tilde{F}$;

inputting the imperfect matrix $\tilde{H}$ into the BBNet model to generate the digital precoding matrix $\tilde{W}$.

12. The method according to claim 11, wherein the BBNet model comprises: a first digital submodel SNet model and a second digital submodel MNet model;

inputting the imperfect matrix $\tilde{H}$ into the BBNet model to generate the digital precoding matrix $\tilde{W}$ comprises:

according to the imperfect matrix $\tilde{H}$, obtaining a diagonally dominant matrix $H_{eq}=\tilde{H}*\tilde{F}$ and a pivot matrix diag ($H_{eq}$);

inputting the diagonally dominant matrix $H_{eq}=\tilde{H}*\tilde{F}$ and the pivot matrix diag ($H_{eq}$) into the SNet model and the MNet model, respectively, and after combination, performing a normalization processing with the imperfect matrix $\tilde{H}$ to generate the digital precoding matrix $\tilde{W}$.

13. The method according to claim 9, wherein the DiSNet model comprises a plurality of paired compression submodels-reconstruction submodels that are identical in structure and independent of each other;

the compression submodel comprises a convolutional layer and a fully connected layer, for extracting and compressing the channel state information;

the reconstruction submodel comprises a fully connected layer and a deep residual network, for reconstructing the compressed channel state information.

14. The method according to claim 11, wherein the RFNet model comprises a convolutional layer and a fully connected layer, with a rectified linear unit (ReLU) function as an activation function, according to the imperfect matrix $\tilde{H}$, generates a shift angle corresponding to the analog precoding matrix $\tilde{F}$, and then calculates to obtain the analog precoding matrix $\tilde{F}$.

15. A communication apparatus, comprising a processor and a memory, wherein a computer program is stored in the memory, and the processor executes the computer program stored in the memory, so that the apparatus performs the method according to claim 1.

16. A computer-readable storage medium for storing instructions, which, when executed, cause the method according to claim 1 to be implemented.

* * * * *